United States Patent
O'Neal

[19]
[11] Patent Number: 5,860,287
[45] Date of Patent: Jan. 19, 1999

[54] COOLNESS STORAGE FOR FIXED CAPACITY REFRIGERATION SYSTEM

[75] Inventor: Edward J. O'Neal, Fort Myers, Fla.

[73] Assignee: Indoor Air Quality Engineering, Fort Myers, Fla.

[21] Appl. No.: 854,538

[22] Filed: May 12, 1997

[51] Int. Cl.[6] .................................................. F25D 11/04
[52] U.S. Cl. ............................ 62/201; 62/228.3; 62/439
[58] Field of Search .......................... 62/201, 439, 228.3, 62/498

[56] References Cited

U.S. PATENT DOCUMENTS

| | | | |
|---|---|---|---|
| 1,601,025 | 9/1926 | King | 62/228.3 |
| 2,102,725 | 12/1937 | Lithgow . | |
| 2,677,243 | 5/1954 | Telkes . | |
| 2,795,114 | 6/1957 | Kleist | 62/439 |
| 2,884,768 | 5/1959 | Gould | 62/225 |
| 4,403,731 | 9/1983 | Katz | 237/2 B |
| 4,928,501 | 5/1990 | Negishi | 62/439 |
| 5,054,540 | 10/1991 | Carr | 165/10 |
| 5,172,567 | 12/1992 | Sadhir | 62/439 |
| 5,211,900 | 5/1993 | Ziegler | 62/439 |
| 5,372,011 | 12/1994 | O'Neal | 62/93 |

FOREIGN PATENT DOCUMENTS 4-55120  2/1992  Japan ....................................... 62/498

*Primary Examiner*—William E. Tapolcai
*Attorney, Agent, or Firm*—Charles J. Brown

[57] ABSTRACT

A coolness storage system for a closed loop refrigeration system having a fixed capacity compressor wherein a phase change material (PCM) in a plurality of chambers around conduit runs arranged in parallel in an evaporator in the system alternately freezes and thaws to modulate the cooling effect on process air flow through the evaporator when the compressor is not operating and to extend the duration of compressor off time.

9 Claims, 3 Drawing Sheets

PROCESS FLUID FLOW

COOLNESS STORAGE FOR FIXED CAPACITY REFRIGERATION SYSTEM

BACKGROUND OF THE INVENTION

It is characteristic of fixed capacity refrigeration systems that they include compressors driven by relatively inexpensive constant speed motors. Small air conditioning systems, typically of less than 10 ton capacity, are often of a single stage design having one compressor operating at constant capacity. Larger staged systems, up to about 100 ton capacity, may have a plurality of compressors each operating at its own fixed capacity so that the total output of the system can be varied in stages. The expression "fixed capacity" as used herein for refrigeration systems means both single and multiple stage systems. Also, the term "refrigeration systems" as used herein is meant to include air conditioning as well as other cooling systems.

The compressors of fixed capacity refrigeration systems are either operating at constant output or they are turned off. It is considered undesirable to cause a fixed capacity system to be shut down every time the load requirement drops below that constant cooling capacity of the system because once turned off the load requirement usually returns promptly to its higher level and the system must be restarted. Frequent on-off cycling of that sort results in a non-uniform cooling effect. In a building air conditioning system, for example, where the input air parameters change over time such cycling results in markedly variable temperature and humidity in the building.

Hence fixed capacity refrigeration systems are often allowed to continue in operation even when their capacity exceeds the load requirements. Part of the system capacity is simply wasted. One way to do this is by the use of a hot gas by-pass circuit in which heat normally discharged from the system is added back to the evaporator. This false load, then added to the reduced process fluid load, allows the system to operate continuously without overcooling the process fluid. These obviously undesirable techniques of wasting cooling capacity in a constantly running system can in many cases consume more than half the total energy input.

In my U.S. Pat. No. 5,372,011 there is described a fixed capacity cooling system where a phase change material (hereinafter referred to as a PCM) is frozen when the cooling load requirements are reduced. When the system is shut down and the reduced cooling load requirements continue they are suitably met by circulating a cooling fluid from heat exchange contact with the frozen PCM to heat exchange contact with the process fluid or load. This melts the PCM and when melting is complete the system is restarted. The compressor in such systems may be cycled on and off while the process fluid is continuously cooled at a reduced level without wasting energy.

The present invention is an improvement on the thermal storage system of my prior patent. It is intended especially for smaller refrigeration loads such as less than 10 tons capacity for single stage and less than 100 tons capacity for multiple stage compressor operation. In contrast with my earlier patented system, the present system is much simpler and does not involve circulation of a cooling fluid between the PCM thermal storage medium and the load. The PCM thermal storage medium in the present system is in direct heat exchange contact with the process fluid or load, for example in the input air duct of an air conditioning system for a building.

Placement of a thermal storage medium in relation to a process fluid flow so that an intermediary coolness fluid is unnecessary is not in itself novel. U.S. Pat. No. 5,054,540 describes one such arrangement but with a decomposable gas hydrate rather than a PCM, and not with a fixed capacity compressor or with refrigerant conduits passing through thermal storage containers as in the present system. U.S. Pat. Nos. 2,677,243 and 4,403,731 describe locating a PCM in a process fluid flow but for heat storage alone and with components unlike those of the present invention. U.S. Pat. No. 2,102,725 also teaches the use of a thermal storage material in contact with process air in a railway refrigerator car, but the material is brine and not a PCM and the compressor is not of fixed capacity. U.S. Pat. No. 2,884,768 also involves thermal storage in an air conditioning system but not with a fixed capacity compressor.

SUMMARY OF THE INVENTION

The invention is applicable to a closed loop refrigeration system wherein a refrigerant circulates from a fixed capacity compressor as a high pressure gas to a condenser, then as a high pressure liquid to an expansion device, then as a low pressure liquid to an evaporator in heat transfer relation to a process fluid flow, and then back to the compressor as a low pressure gas. The invention provides a coolness storage system for modulating the cooling effect on the process fluid flow. The system includes a plurality of conduit runs in the evaporator through which the refrigerant circulates. An outer enclosure is provided about each conduit run defining therewith a chamber adapted to be partially filled with a PCM. The conduit runs and their respective enclosures are in heat transfer relation with surfaces over which the process fluid flows. An on-off control valve is included in the closed loop system. A first sensor is provided for stopping compressor operation and closing the control valve when the PCM is fully frozen as indicated by a certain minimum pressure of the refrigerant. A second sensor is provided for starting compressor operation and opening the control valve when the PCM is fully melted as indicated by a certain maximum pressure of the refrigerant. As a consequence the PCM in the chambers around the conduit runs in the evaporator alternately freezes and thaws and when thawing removes heat from the process fluid flow to modulate the cooling effect on that flow while the compressor is not operating and extends the duration of compressor off time.

In a preferred form of the invention the conduit runs are arranged in parallel and each is a horizontally disposed inner tube of circular cross-section, the outer enclosure is a cylindrical encasement tube sealed at each end to and disposed concentrically about the inner tube with the chamber defined therewith being annular, and the PCM partially fills the chamber to a level above the refrigerant tube.

Radiator elements may extend outwardly from the encasement tube for enhanced direct heat transfer relation with the process fluid flow. These radiator elements may be a multiplicity of substantially side-by-side fins. Thermal bridge elements may extend in heat transfer relation between the exterior of the inner tube and the interior of the encasement tube. The on-off control valve may be located downstream from the condenser and upstream from the evaporator. The first and second sensors sense the saturated refrigerant pressure within the evaporator.

DESCRIPTION OF PREFERRED EMBODIMENT

Figure 1:
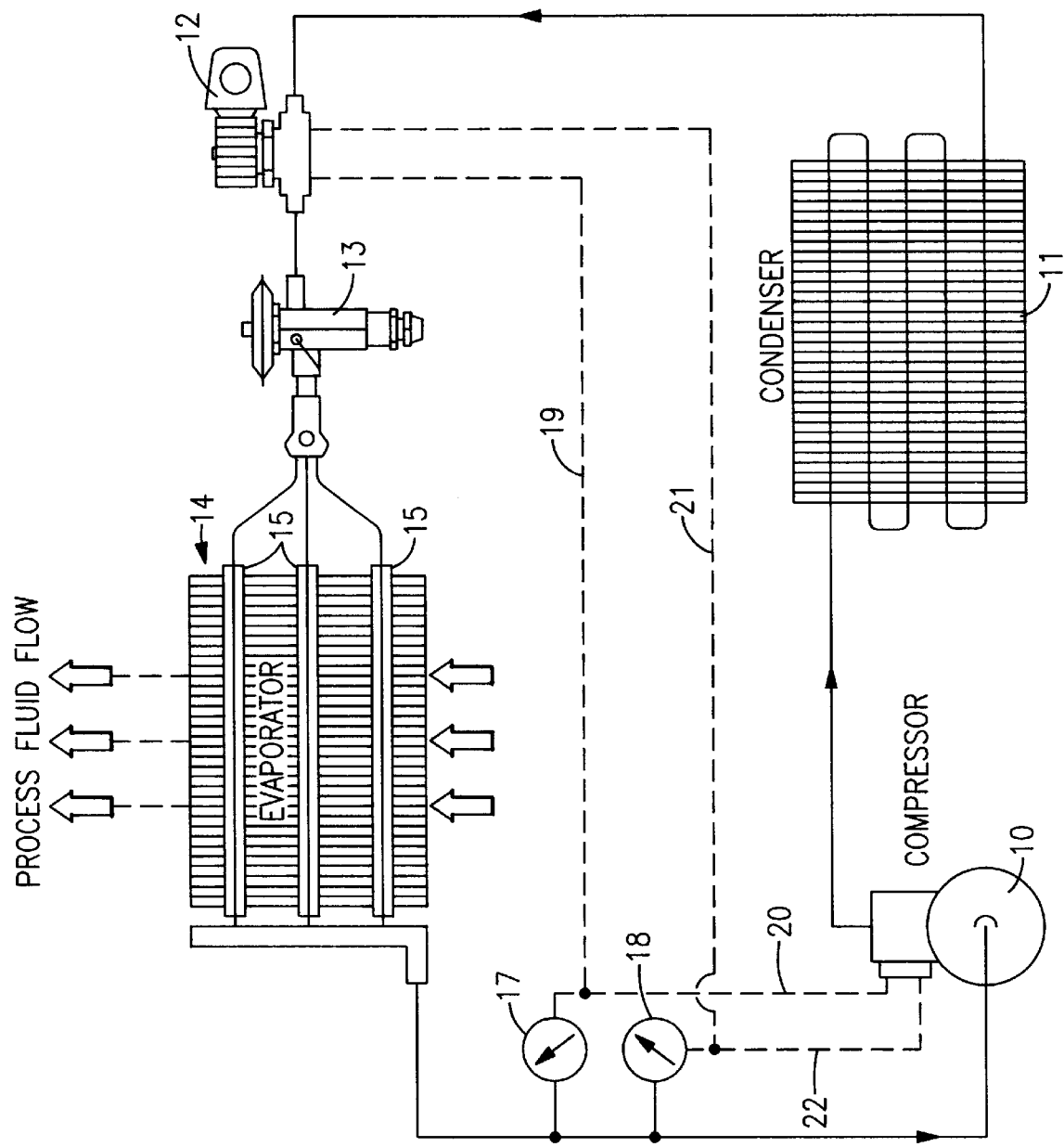
FIG. 1 is a schematic illustration of a closed loop refrigeration system equipped with the coolness storage system of the invention.

Referring first to FIG. 1, conventional components of a standard vapor-compression refrigeration system are shown including a fixed capacity compressor 10 from which a relatively high pressure refrigerant gas is delivered to a condenser 11. The refrigerant leaves the condenser 11 as a relatively high pressure liquid and is carried through a liquid solenoid valve 12. The high pressure liquid refrigerant then passes through a thermal expansion valve 13 from which it exits as a relatively low pressure liquid. The refrigerant is then directed through an evaporator 14 and specifically through a plurality of horizontal conduit runs 15 in the evaporator 14. The conduit runs 15 are arranged in parallel as opposed to in series. As shown by the solid arrows in FIGS. 1 and 2, a process fluid flows through the evaporator in heat exchange contact with the conduit runs 15. From the evaporator 14 the refrigerant continues as a low pressure gas back to the compressor 10.

Between the evaporator 14 and the compressor 10 is a low pressure switch 17 followed by a high pressure switch 18. The low pressure switch 17 is typically connected to the liquid solenoid valve 12 by an electrical circuit line 19 and with the compressor 10 by a similar line 20. The high pressure switch 18 is similarly connected to the solenoid valve 12 by a circuit line 21 and with the compressor 10 by a line 22. The low pressure switch 17 acts as a first sensor for closing the control valve 12 and stopping the operation of the compressor 10 in response to a certain minimum pressure of the refrigerant. The high pressure switch 18 acts as a second sensor for opening the control valve 12 and starting the operation of the compressor 10 in response to a certain maximum pressure of the refrigerant.

Figure 2:
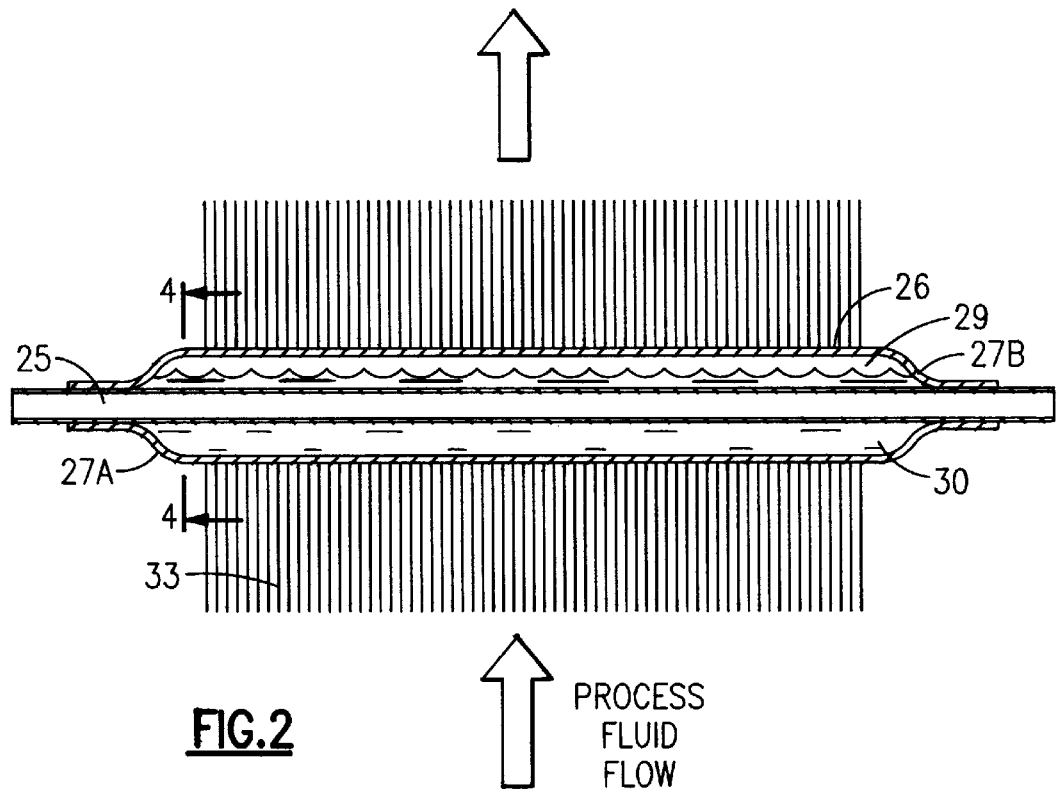
FIG. 2 is a fragmentary enlarged longitudinal section taken along a centerline of one of the conduit runs in the evaporator and its outer encasement tube.
Figure 4:
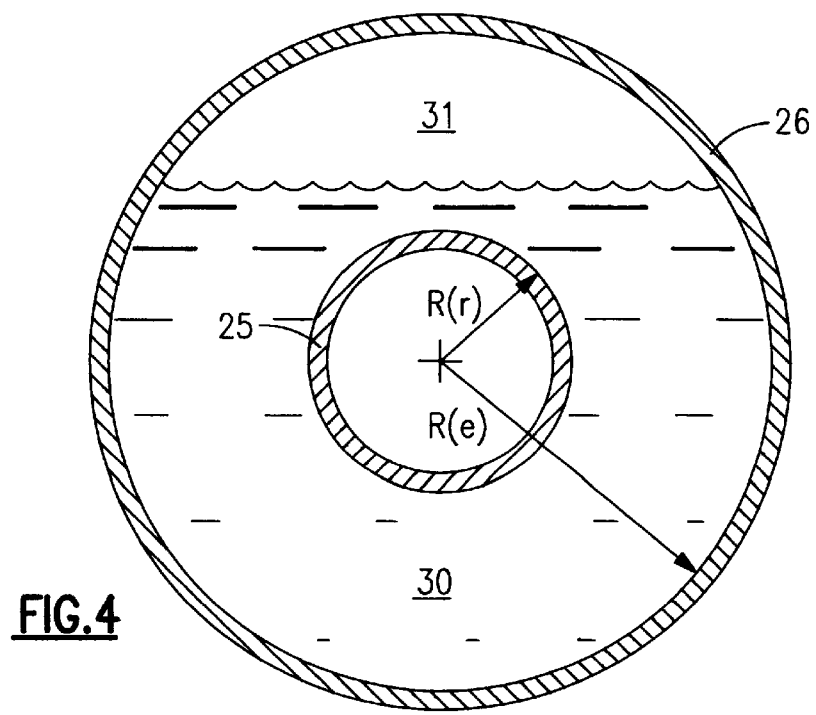
FIG. 4 is a lateral section taken along the line 4—4 of FIG. 2.
Figure 3:
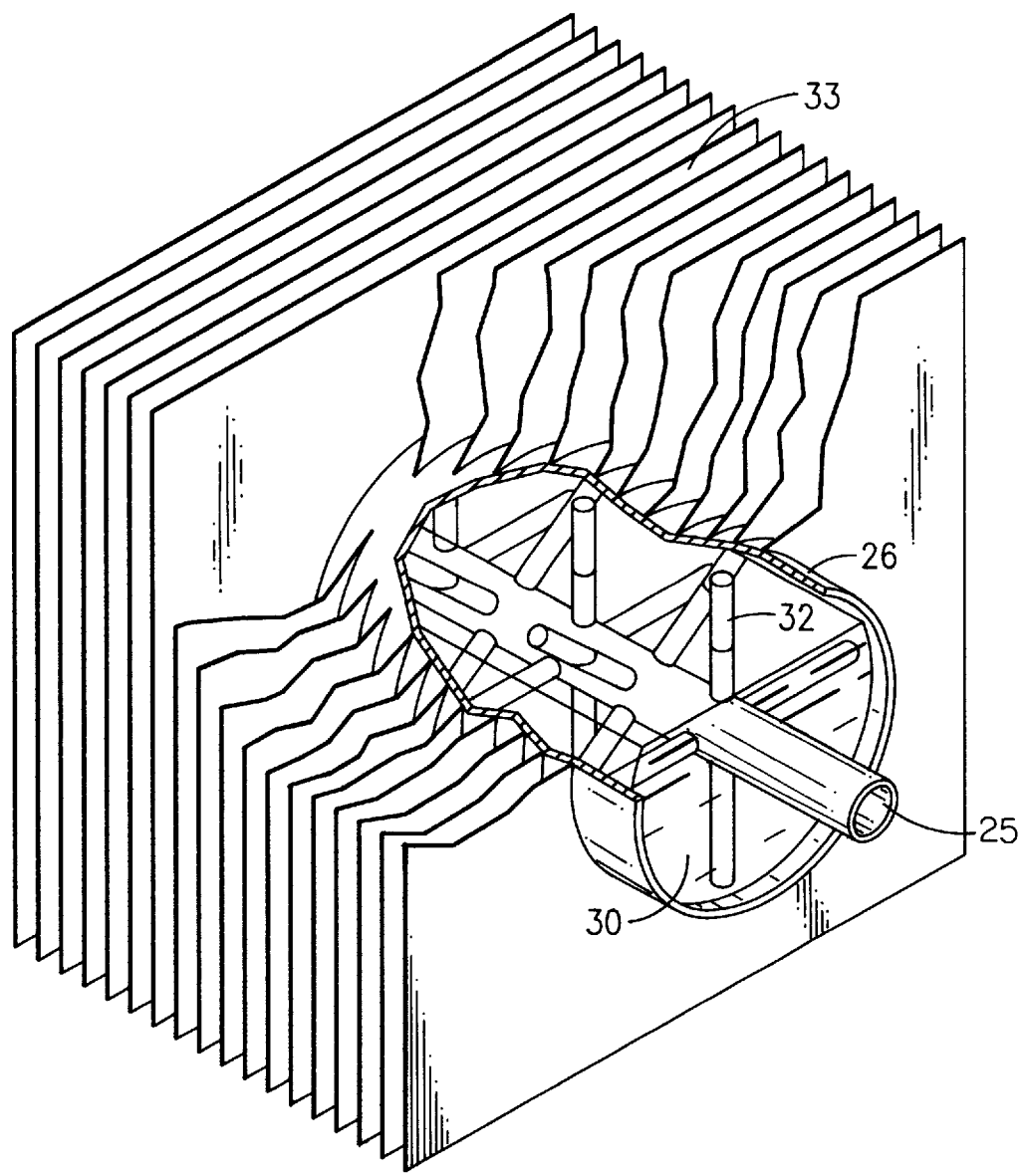
FIG. 3 is an enlarged perspective view partly broken away showing the thermal bridges and other components associated with an outer encasement tube in one of the conduit runs.

Turning now to FIGS. 2 to 4 one of the several parallel runs 15 in the evaporator 14 is shown in detail. A given conduit run 15 includes a horizontal inner tube 25 and an outer encasement tube 26. The outer encasement tube includes opposite end portions 27A and 27B which are closed against the outside surface of the inner tube 25 to form a sealed annular chamber 29 concentrically around the inner tube 25. As shown in FIG. 4 this annular chamber 29 is partially filled with a PCM 30 such as water. The annular chamber, being partially filled with a PCM provides an ullage space above the level of the PCM to allow for contraction and expansion during freezing and thawing of the PCM.

To enhance thermal conductivity from the inner tube 25 outwardly to the encasement tube 26, a plurality of thermal bridges 32 are provided as shown in FIG. 3. These are illustrated as substantially coplanar rods spaced 90° apart in a given set of four with successive sets spaced uniformly along the length of the inner and encasement tubes 25 and 26 each turned 45° from the sets immediately alongside it. To enhance thermal conductivity from the outer encasement tube 26 to the process fluid tube, a multiplicity of radiator elements 33 are provided along the length of the encasement tubes 26. They are shown somewhat schematically as a multiplicity of closely spaced parallel flat square metal plates.

The particular form of the thermal bridges 32 and radiator elements 33 illustrated in FIGS. 2 and 3 are only intended to illustrate the operation of those components. In actual practice it may be found preferable to form the thermal bridges 36 from a multiplicity of closely spaced turns of a helical wire spring tightly contacting the outside of the inner tube 25 and the inside of the encasement tube 26. Similarly the radiator elements in actual practice may be a multiplicity of helical turns of sheet metal with each turn having an outer circular circumference and with the inside of the turns tightly engaging the outside of the encasement tube 26.

In the operation of the coolness storage system of the invention at a relatively high load, the process fluid temperature and/or volume flowing through the evaporator 14 cause all of the liquid refrigerant to evaporate at a refrigerant temperature above the freezing temperature of the PCM so that the refrigeration system operates continuously. As the load requirements reduce and the process fluid temperature and/or volume declines, the refrigerant within the evaporator 14 will evaporate at a progressively lower temperature and pressure. When the evaporation temperature falls below the freezing temperature of the PCM, 32° F. for water, ice begins to form within each annular chamber 29 in the various conduit runs 15. As the PCM progressively freezes in each of the annular chambers 29 the evaporating refrigerant pressure remains relatively constant. However, when all of the PCM has been frozen, the evaporating refrigerant pressure falls quickly. The low pressure switch 17 is pre-set so that when the falling refrigerant pressure reaches a certain predetermined minimum the low pressure switch 17 closes the control valve 12 and stops the operation of the compressor 10.

Even though the system is then shut down, the process fluid flow continues to be cooled since the frozen PCM 30 in each chamber 29 is in direct heat exchange contact with the process fluid through the outer encasement tube 26 and the radiator elements 33. This continuation of the cooling effect may appropriately be termed a kind of thermal flywheel since the cooling energy transferred to the load is ongoing despite of the fact that there is no longer an energy input from mechanical operation of the refrigeration system. In typical installations this thermal flywheel effect will continue for five to ten minutes. During that time as the ice melts the pressure of the saturated refrigerant within the chambers 29 remains substantially constant. However, when all of the frozen PCM is melted the refrigerant pressure within the chambers 29 rises quickly. The high pressure switch 18 is pre-set so that when the increasing refrigerant pressure reaches a certain maximum the high pressure switch acts as a sensor for opening the control valve 12 and starting the compressor 10. The system is thus restored to continuous operation until requirements of the process fluid flow or load again drop below the capacity of the system causing the cycle to be repeated.

It will be understood that a particular relation exists in general between the outside radius of the inner tube 25 designated in FIG. 4 as R(r) and the inside radius of the encasement tube 26 designated in FIG. 4 as R(e). Per unit of system capacity, R(r) bears a particular general relationship to R(e). It has been noted that the outside surface area of the inner tube 26 is relatively constant per unit of nominal system capacity. This constant varies with thermal bridge and radiator efficiency but nonetheless ranges between 0.04 to 0.05 square inches of surface area per BTU/hr of nominal system capacity. In a given conduit run the annular volume of PCM within the chamber 29 is determined by R(r), R(e) and the effective length of the inner and outer encasement tubes 25 and 26. The volume of PCM is proportional to both the system nominal refrigeration capacity and the duration of compressor off time. That duration of compressor off time should be sufficient to allow for dissipation of excessive refrigerant pressure in the compressor 10 and for reasonable cooling of the motor of the compressor 10. As noted, typical compressor off times should range from five to ten minutes.

Since the effective length of the inner and outer encasement tubes 25 and 26 is substantially the same, the relationship between R(r) and R(e) may be reduced to a function presented as follows:

$$R(e) = \text{Square Root}\{(C \times T(o) \times R(r)/(LHF \times A(r)) + R(r)^2\}$$

Where:
C=0.03333, a constant
T(o)=compressor off cycle duration (min)
R(r)=outer radius of the inner tube (in)
LHF=latent heat of fusion of PCM (BTU/cu in)
A(r)=outer area of inner tube per unit of system capacity (sq in/BTUH)

For fixed value of T(o), LHF and A(r) the function may be further reduced as:

$$R(e) = \text{Square Root}\{C \times R(r) + R(r)^2\}$$

With the minimum ratio of R(e)/R(r) where:
T(o)=5 minutes
LHF=5.2083 BTU/cu in (water at 32 degrees)
A(r)=0.05 sq in/BTUH $$R(e) = \text{Square Root}\{0.64 \times R(r) + R(r)^2\}$$

With the maximum ratio of R(e)/R(r) where:
T(o)=10 minutes
LHF=5.2083 BTU/cu in (water at 32 degrees)
A(r)=0.04 sq in/BTUH $$R(e) = \text{Square Root}\{1.6 \times R(r) + R(r)^2\}$$

For common values of R(r) the minimum and maximum values of R(e) are:

|       | Minimum |         | Maximum |         |
|-------|---------|---------|---------|---------|
| R(r)  | R(e)    | R(e)/R(r) | R(e)  | R(e)/R(r) |
| .1250 | .309    | 2.97    | .464    | 3.71    |
| .1875 | .394    | 2.10    | .579    | 3.09    |
| .2500 | .472    | 1.89    | .680    | 2.72    |
| .3750 | .546    | 1.75    | .773    | 2.47    |

These values in the minimum and maximum outside radius of the inner tube 25 and inside radius of the encasement tube 26 may aid those skilled in the art in designing a coolness storage system for a fixed capacity refrigeration system in accordance with the invention.

The scope of the invention is to be determined by the following claims rather than the foregoing description of a preferred embodiment.

I claim:

1. In a closed loop refrigeration system wherein a refrigerant circulates from a fixed capacity compressor as a high pressure gas to a condenser, then as a high pressure liquid to an expansion device, then as a low pressure liquid to an evaporator in heat transfer relation to a process fluid flow in which evaporator the refrigerant is in saturated condition, and then back to the compressor as a low pressure gas, a coolness storage system for modulating the cooling effect on the process fluid flow comprising a) a plurality of conduit runs in the evaporator through which the saturated refrigerant circulates,
   b) an outer enclosure about each conduit run defining therewith a chamber adapted to be partially filled with a PCM,
   c) an on-off control valve in the closed loop system,
   d) a first sensor for stopping compressor operation and closing the control valve when the PCM is fully frozen as indicated by a certain minimum pressure of the saturated refrigerant,
   e) a second sensor for starting compressor operation and opening the control valve when the PCM is fully melted as indicated by a certain maximum pressure of the saturated refrigerant,
   f) whereby the PCM in the chambers around the conduit runs in the evaporator alternately freezes and thaws and removes heat from the process fluid flow to modulate the cooling effect on that flow when the compressor is not operating and to extend the duration of compressor off time.

2. A coolness storage system according to claim 1 wherein the conduit runs are arranged in parallel and each is a horizontally disposed inner tube of circular cross-section, the outer enclosure is a cylindrical encasement tube sealed at each end to and disposed concentrically about the inner tube with the chamber defined therebetween being annular.

3. A coolness storage system according to claim 2 wherein radiator elements extend outwardly from the encasement tube for enhanced direct heat transfer with the process fluid flow.

4. A coolness storage system according to claim 3 wherein said radiator elements are a multiplicity of substantially side-by-side fins.

5. A coolness storage system according to claim 1 wherein the on-off control valve is downstream from the condenser and upstream from the expansion device.

6. A coolness storage system according to claim 1 wherein the first and second sensors sense the saturated refrigerant pressure within the evaporator.

7. In a closed loop refrigeration system wherein a refrigerant circulates from a fixed capacity compressor as a high pressure gas to a condenser, then as a high pressure liquid to an expansion device, then as a low pressure liquid to an evaporator in heat transfer relation to a process fluid flow, and then back to the compressor as a low pressure gas, a coolness storage system for modulating the cooling effect on the process fluid flow comprising a) a plurality of conduit runs arranged in parallel in the evaporator through which the refrigerant circulates with each conduit run comprising a horizontally disposed inner tube of circular cross-section,
   b) a cylindrical encasement tube sealed at each end to and disposed concentrically about each inner tube and defining therewith an annular chamber adapted to be partially filled with a PCM,
   c) radiator elements extending outwardly from the encasement tube for enhanced heat transfer relation with the process fluid flow with each radiator element comprising a multiplicity of substantially side-by-side fins,
   d) thermal bridge elements comprising metal members disposed about the inner tube and extending in direct heat transfer relation between the exterior of the inner tube and the exterior of the encasement tube,
   e) an on-off control valve in the closed loop refrigerant system, f) a first pressure sensor sensing the saturated refrigerant pressure within the evaporator for stopping compressor operation and closing the control valve when the PCM is fully frozen as indicated by a certain minimum pressure of the refrigerant, g) a second sensor sensing the pressure of the refrigerant downstream of the evaporator and upstream of the compressor for starting compressor operation and opening the control valve when the PCM is fully melted as indicated by a certain maximum pressure of the refrigerant, h) whereby the PCM in the chambers around the conduit runs in the evaporator alternately freezes and thaws and when thawing removes heat from the process fluid flow to modulate the cooling effect on that flow when the compressor is not operating and to extend the duration of compressor off time.

8. In a closed loop refrigeration system wherein a refrigerant circulates from a fixed capacity compressor as a high pressure gas to a condenser, then as a high pressure liquid to an expansion device, then as a low pressure liquid to an evaporator in heat transfer relation to a process fluid flow, and then back to the compressor as a low pressure gas, a coolness storage system for modulating the cooling effect on the process fluid flow comprising a) a plurality of parallel conduit runs in the evaporator through which the refrigerant circulates wherein each run comprises a horizontally disposed inner tube of circular cross section, b) an outer enclosure about each conduit run defining therewith a chamber adapted to be partially filled with a PCM wherein each outer enclosure comprises a cylindrical engagement tube sealed at each end to and disposed concentrically about the inner tube with the chamber defined therebetween being annular, c) thermal bridge elements extending in direct heat transfer relation between the exterior of each inner tube and the interior of its associated engagement tube so that the conduit runs and their respective enclosures are in direct heat transfer relation with surfaces over which the process fluid flows, d) an on-off control valve in the closed loop system, e) a first sensor for stopping compressor operation and closing the control valve when the PCM is fully frozen as indicated by a certain minimum pressure of the refrigerant, and f) a second sensor for starting compressor operation and opening the control valve when the PCM is fully melted as indicated by a certain maximum pressure of the refrigerant, g) whereby the PCM in the chambers around the conduit runs in the evaporator alternately freezes and thaws and removes heat from the process fluid flow to modulate the cooling effect on that flow when the compressor is not operating and to extend the duration of compressor off time.

9. In a closed loop refrigeration system wherein a saturated refrigerant circulates from a fixed capacity compressor as a high pressure gas to a condenser, then as a high pressure liquid to an expansion device, then as a low pressure liquid to an evaporator in heat transfer relation to a process fluid flow in which evaporator the refrigerant is in saturated condition, and then back to the compressor as a low pressure gas, a coolness storage system for modulating the cooling effect on the process fluid flow comprising a) a plurality of conduit runs in the evaporator through which the saturated refrigerant circulates, b) an outer enclosure about each conduit run defining therewith a chamber adapted to be partially filled with a PCM, c) thermal bridge elements between each conduit run and its outer enclosure so that the conduit runs and their respective enclosures are in direct heat transfer relation with surfaces over which the process fluid flows, d) an on-off control valve in the closed loop system, e) a first sensor for stopping compressor operation and closing the control valve when the PCM in the evaporator is fully frozen as indicated by a certain minimum pressure of the saturated refrigerant, f) a second sensor for starting compressor operation and opening the control valve when the PCM in the evaporator is fully melted as indicated by a certain maximum pressure of the saturated refrigerant, g) whereby the PCM in the chambers around the conduit runs in the evaporator alternately freezes and thaws and removes heat from the process fluid flow to modulate the cooling effect on that flow when the compressor is not operating and to extend the duration of compressor off time.

* * * * *